(12) United States Patent
Kong (10) Patent No.: US 9,623,639 B2
(45) Date of Patent: Apr. 18, 2017

(54) OPEN CORE CRASH PAD AND PROCESS FOR MANUFACTURING THEREOF

(71) Applicants: Hyundai Motor Company, Seoul (KR); Kia Motors Corporation, Seoul (KR)

(72) Inventor: Byung Seok Kong, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/930,263

(22) Filed: Nov. 2, 2015

(65) Prior Publication Data

US 2016/0159304 A1 Jun. 9, 2016

(30) Foreign Application Priority Data

Dec. 9, 2014 (KR) ........................ 10-2014-0175665

(51) Int. Cl.
| | | |
|---|---|---|
| B60R 21/045 | (2006.01) | |
| B32B 27/30 | (2006.01) | |
| B32B 5/20 | (2006.01) | |
| B32B 3/30 | (2006.01) | |
| B29C 44/12 | (2006.01) | |
| B29C 44/34 | (2006.01) | |
| B29K 75/00 | (2006.01) | |
| B29L 31/30 | (2006.01) | |
| B60R 21/04 | (2006.01) | |

(52) U.S. Cl.
CPC ........ B32B 27/304 (2013.01); B29C 44/1257 (2013.01); B29C 44/351 (2013.01); B32B 3/30 (2013.01); B32B 5/20 (2013.01); *B29K 2075/00* (2013.01); *B29K 2995/0091* (2013.01); *B29L 2031/3005* (2013.01); *B32B 2571/00* (2013.01); *B32B 2605/00* (2013.01); *B60R 21/04* (2013.01)

(58) Field of Classification Search
CPC ... B60R 21/045; B29C 65/5057; B29C 44/10; B29C 45/14; B29C 45/16; B29C 45/17; B32B 5/20; B32B 3/30; B32B 27/304
See application file for complete search history.

(56) References Cited

U.S. PATENT DOCUMENTS

| 2013/0313748 A1* | 11/2013 | Kong | ................... B29C 44/18 |
| | | | 264/46.8 |
| 2014/0161923 A1* | 6/2014 | Kong | ................. B29C 45/2608 |
| | | | 425/515 |
| 2014/0167306 A1* | 6/2014 | Kong | ................. B29C 33/0038 |
| | | | 264/46.5 |

FOREIGN PATENT DOCUMENTS

| JP | 2000-246742 A | 9/2000 |
| KR | 10-0412663 B1 | 12/2003 |
| KR | 10-2004-0035170 A | 4/2004 |
| KR | 10-2013-0025304 A | 3/2013 |
| KR | 10-2014-0076164 A | 6/2014 |

(Continued)

*Primary Examiner* — Vishal Sahni
(74) *Attorney, Agent, or Firm* — McDermott Will & Emery LLP (57) ABSTRACT

An open core crash pad includes a core and a skin abutting the core to include a forming space therebetween. A foaming layer is foam-formed by injecting a foam liquid into the forming space. A foam tape prevents an overflow of the foam liquid. The skin includes a body portion and a distal end which extends from the body portion in parallel with the core. The core comprises a protrusion protruding toward the skin and formed at which the core and the distal end contact.

7 Claims, 7 Drawing Sheets

(56) References Cited

FOREIGN PATENT DOCUMENTS

KR 10-1428274 B1 8/2014
KR 10-1428292 B1 8/2014

\* cited by examiner

FIG.1

-- Prior Art --

FIG.2

-- Prior Art --

FIG.3

-- Prior Art --

FIG.4A

-- Prior Art --

FIG.4B

-- Prior Art --

OPEN CORE CRASH PAD AND PROCESS FOR MANUFACTURING THEREOF

CROSS-REFERENCE TO RELATED APPLICATION

This application claims under 35 U.S.C. §119(a) the benefit of priority to Korean Patent Application No. 10-2014-0175665 filed on Dec. 9, 2014, the entire content of which is incorporated herein by reference.

TECHNICAL FIELD

The present disclosure relates to an open core crash pad and a method of manufacturing thereof.

BACKGROUND

A vehicle has a crash pad to maximally protect passengers when an accident occurs. The crash pad is installed at a front side of a drivers and passenger's seats.

This crash pad is made of a foam material having an elastic cushion performance and a property of absorbing an impact of certain degree and providing an aesthetic effect.

The conventional crash pad for a vehicle includes a skin for providing an aesthetic effect, and a core for supporting the crash pad at an inner side of the skin as a framework. A foaming layer for providing a cushion performance and a shock absorption performance is interposed between the core and the skin.

A method of manufacturing a crash pad includes an open core method in which foaming is performed while a non-foamed region is opened, and a close core method in which foaming is performed without the non-foamed region. However, since the close core method requires additional parts such as separate members which increase cost, the open core method has been mainly used.

Figure 1:
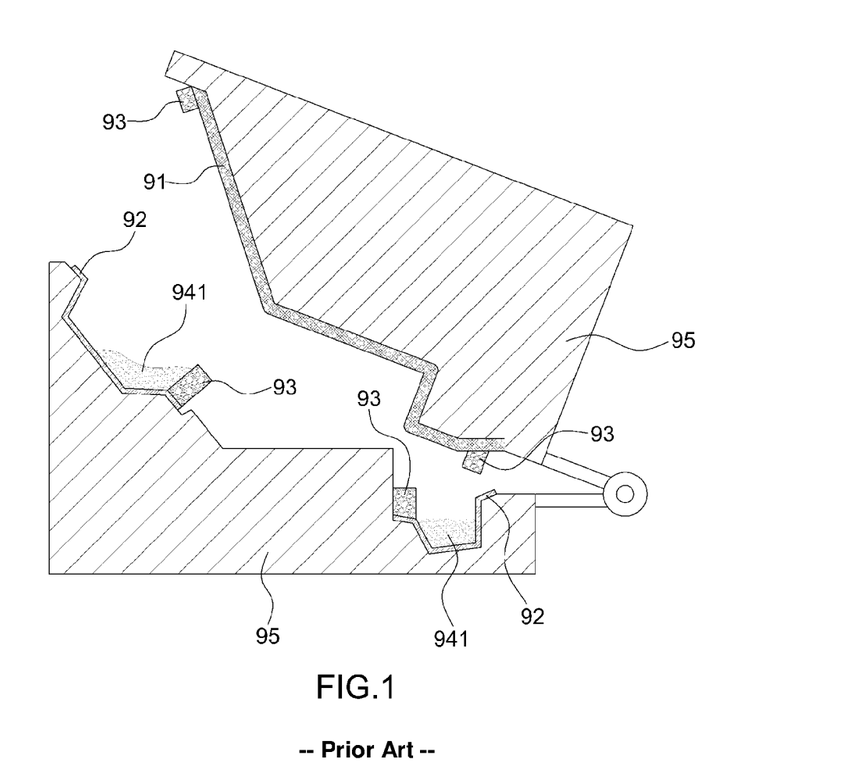
FIG. 1 is a view illustrating a manufacturing process of a conventional open core crash pad.
Figure 2:
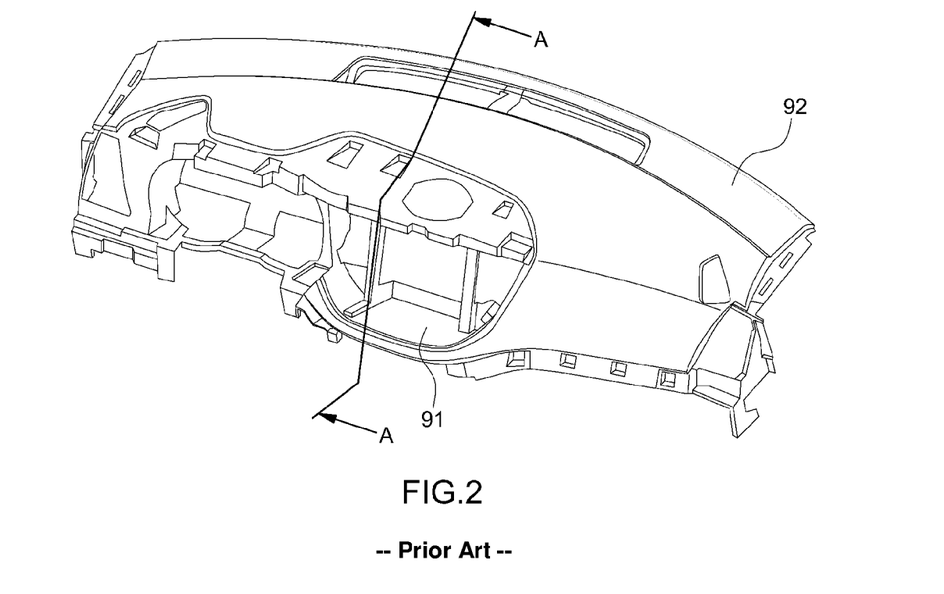
FIG. 2 is a view illustrating a conventional open core crash pad.
Figure 3:
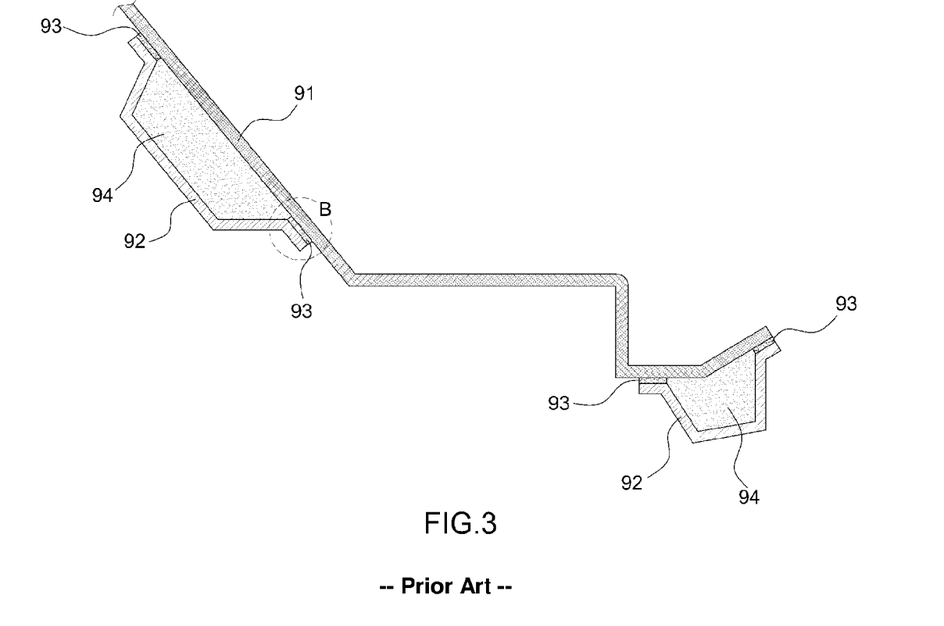
FIG. 3 is a view illustrating a cross section of the line A-A of FIG. 2.

FIG. 1 is a view illustrating a manufacturing process of a conventional open core crash pad. A core 91 and a skin 92 are inserted into a mold 95, and thereafter, a foam tape 93 is attached to the skin 92 so that a foam liquid 941 does not overflow. The open core crash pad as shown in FIGS. 2 and 3 in which a foaming layer 94 is interposed between the core 91 and the skin 92 by pressing the mold 95 may be manufactured.

Figure 4A:
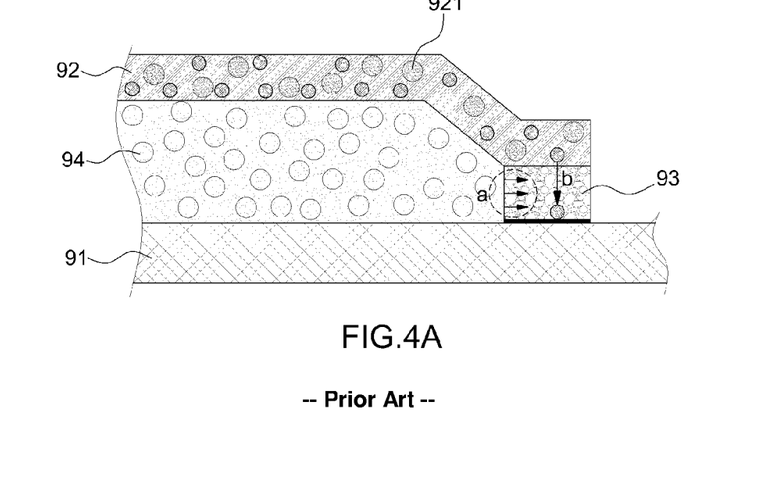
FIGS. 4A and 4B are views illustrating a detachment phenomenon of a foam tape by enlarging the B portion of FIG. 3.
Figure 4B:
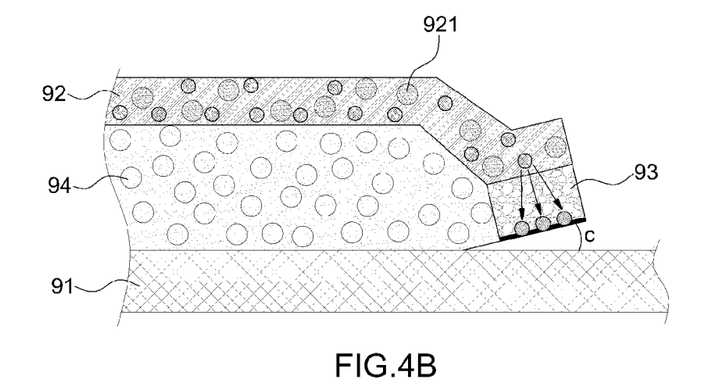

Referring to FIG. 4A, the conventional crash pad has a foam liquid absorbed into a foam tape 93 (a) during a foaming process (foaming reaction) in which a foaming layer 94 is formed so that the foaming layer 94 and the foam tape 93 are completely attached. However, a plasticizer 921 of a skin 92 is transited to a foam tape 93 (b) in a heat resisting aging test process so that the adhesive force of the foam tape 93 is reduced, whereby when the heat resisting aging test is completed, a phenomenon (c) occurs that the foam tape 93 is detached as shown in of FIG. 4B.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art.

An aspect of the present inventive concept provides an open core crash pad which may prevent the quality deterioration due to transition of a plasticizer to a foam tape.

The objects of the present disclosure are not limited to the objects described above, and other objects not mentioned will be obviously understood by those of ordinary skill in the art.

The present disclosure to accomplish the objects described above may include the constructions described hereinafter.

According to an exemplary embodiment of the present inventive concept, an open core crash pad includes a core and a skin abutting the core to include a forming space therebetween. A foaming layer is foam-formed by injecting a foam liquid into the forming space. A foam tape prevents an overflow of the foam liquid. The skin comprises a body portion and a distal end which extends from the body portion in parallel with the core. The core comprises a protrusion protruding toward the skin and formed at which the core and the distal end contact.

The protrusion and the foam tape are closely attached.

The protrusion includes a head inclined and having a sharp end.

The distal end includes a weakened section which is recessed from an outer side at which the distal end contacts the protrusion.

The distal end is removably attached together with the foam tape.

The skin is a polyvinyl chloride (PVC) powder slush.

According to another exemplary embodiment of the present inventive concept, a method of manufacturing an open core crash pad includes inserting a core into an upper mold and inserting a skin into a lower mold. The foam tape is attached to the core or the skin. The foam liquid is injected into the forming space of the skin. The foaming layer is manufactured by pressing the upper mold and the lower mold. The skin comprises a body portion and a distal end which extends from the body portion in parallel with the core. The core comprises a protrusion formed at an inner side of the foam tape at which the core and the distal end abut.

The foam tape is closely attached to the protrusion when the upper mold and the lower mold are pressed.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present inventive concept.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Figure 5:
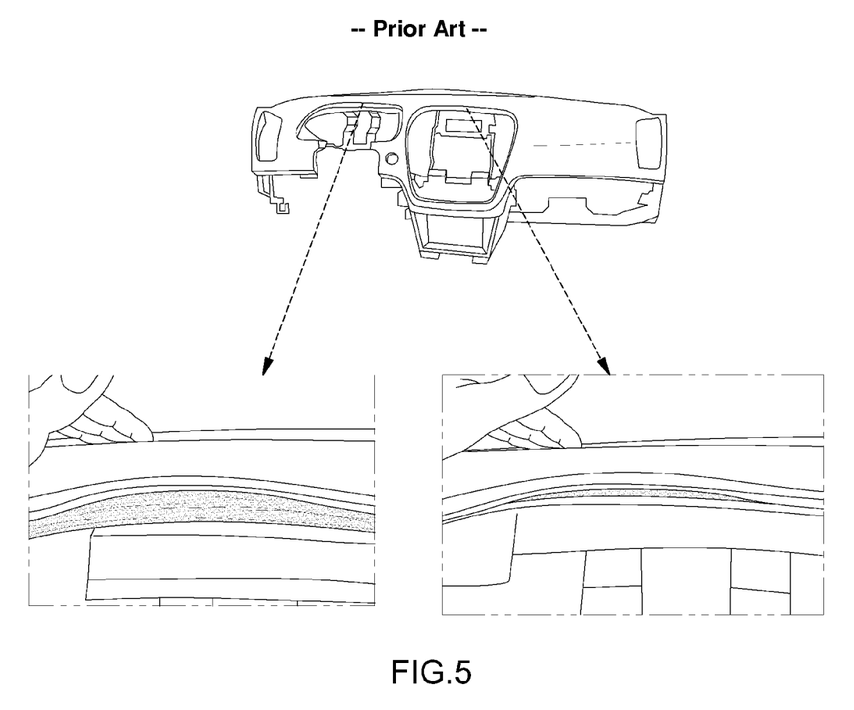
FIG. 5 shows an actual product in which the foam tape is detached.
Figure 6:
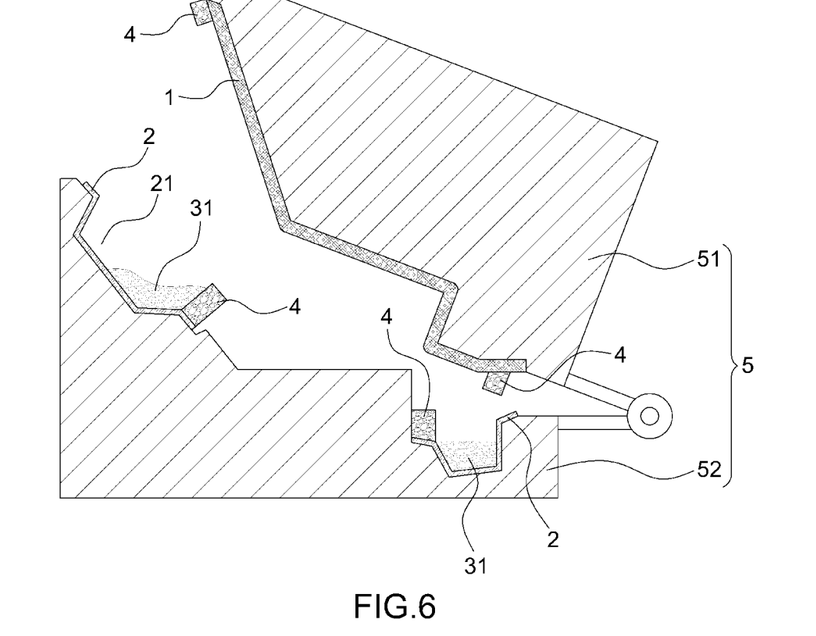
FIG. 6 is a view illustrating a manufacturing process of an open core crash pad according to the present disclosure.
Figure 7:
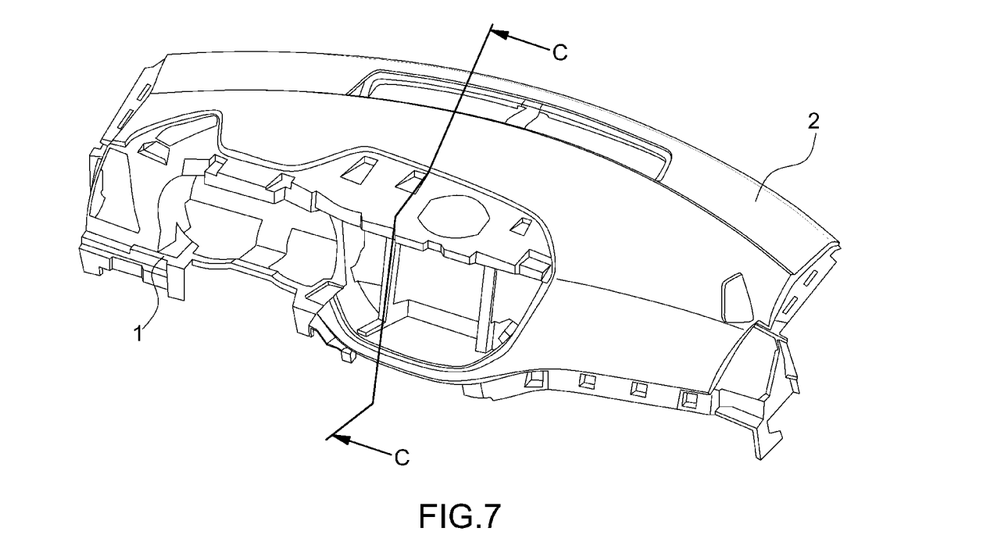
FIG. 7 is a view illustrating an open core crash pad according to the present disclosure.
Figure 8:
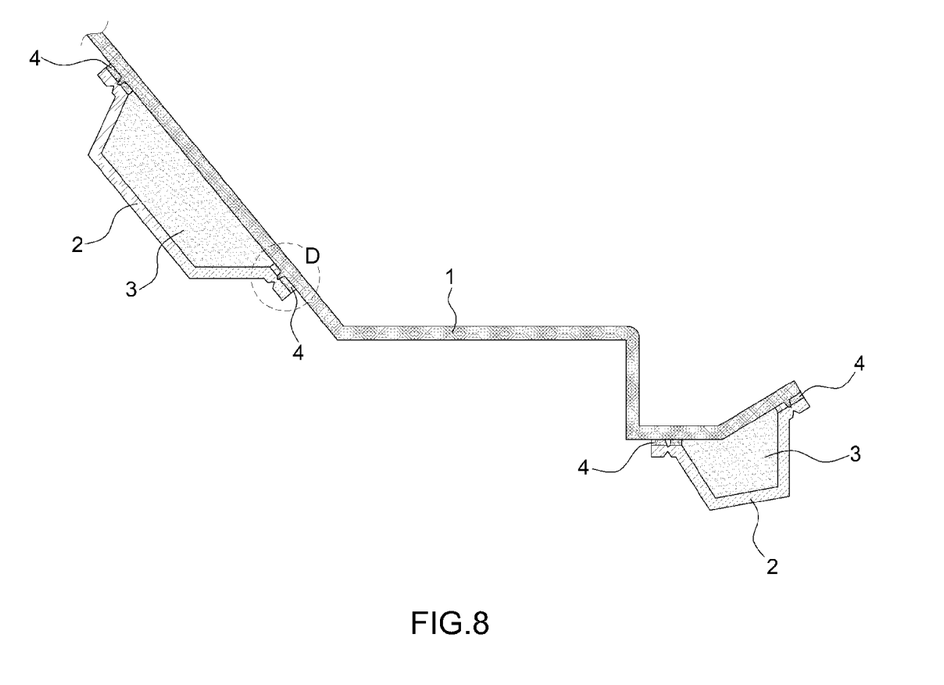
FIG. 8 is a view illustrating a cross section of the line C-C of FIG. 7.

FIG. 5 shows a final product in which a foam tape is detached. FIG. 6 is a view illustrating a manufacturing process of an open core crash pad according to the present disclosure. FIG. 7 is shows an open core crash pad according to the present disclosure.

An open core crash pad according to the present disclosure includes a core 1 and a skin 2 including a forming space 21. A foaming layer 3 is foam-formed by injecting a foam liquid 31 to the forming space 21. A foam tape 4 prevents an overflow of the foam liquid 31. The open core crash pad may be manufactured by inserting the core 1, the skin 2, the foam liquid 31, and the foam tape 4 into a mold 5, and pressing the mold 5.

Hereinafter, referring to FIGS. 6 to 10, each structural element of the present disclosure together with the manufacturing process of the crash pad will be described in detail.

Referring to FIG. 6, the crash pad may be manufactured by inserting the core 1 into an upper mold 51, inserting the skin 2 into a low mold 52, and thereafter, pressing the upper mold 51 and the lower mold 52.

Figure 9A:
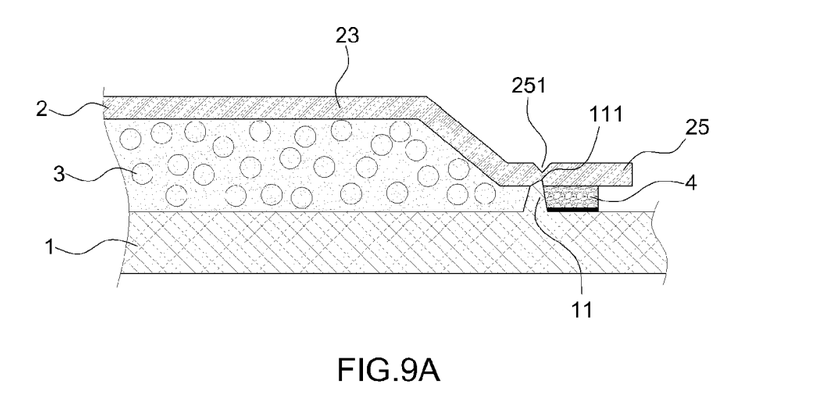
FIGS. 9A and 9B are views illustrating a process of removing the foam tape by enlarging the D section of FIG. 8.
Figure 9B:
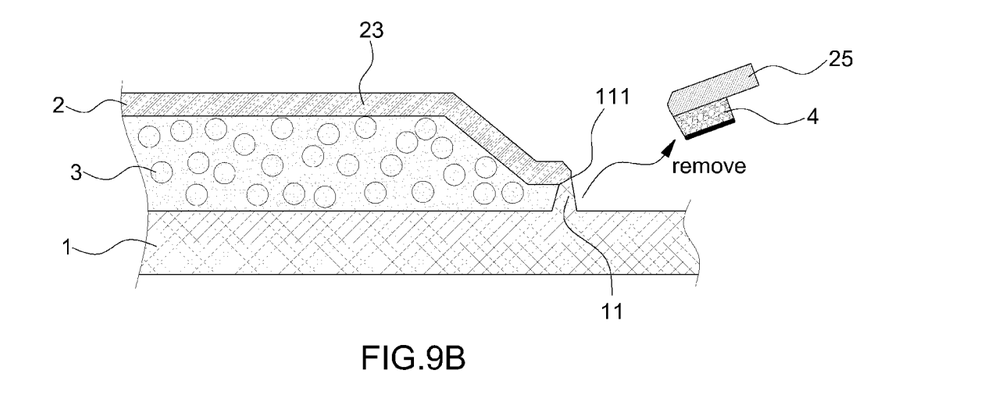

The core 1 supports the crash pad as a framework, and referring to FIGS. 9A and 9B, when the mold 5 is pressed, the core 1 may include a protrusion 11 protruding toward the skin 2 at which the core 1 and the skin 2 meet.

Figure 10A:
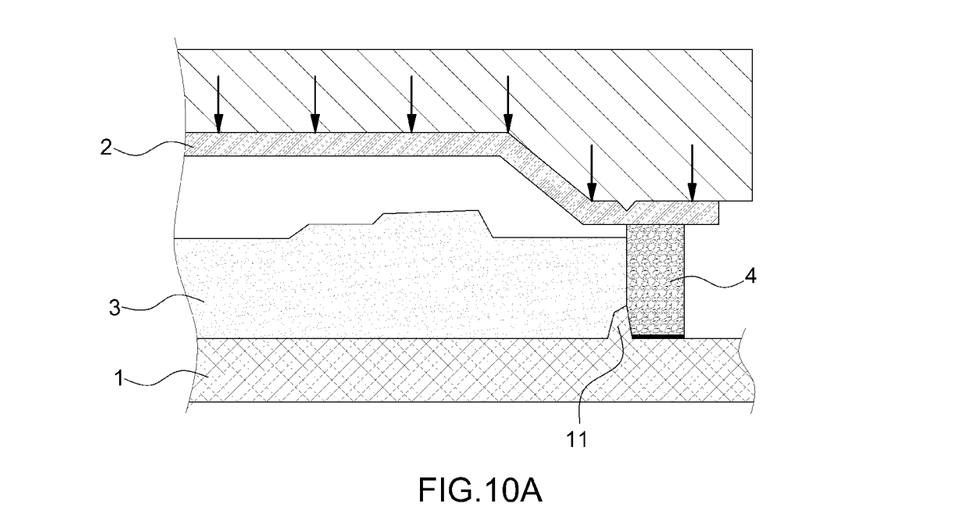
FIGS. 10A-10C are views illustrating a process of closing a mold of FIG. 6 to a process of removing the foam tape after a foaming process is completed.
Figure 10B:
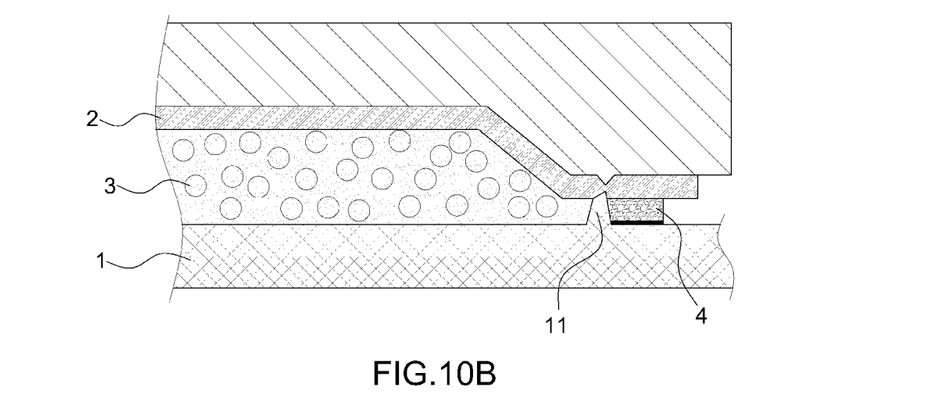
Figure 10C:
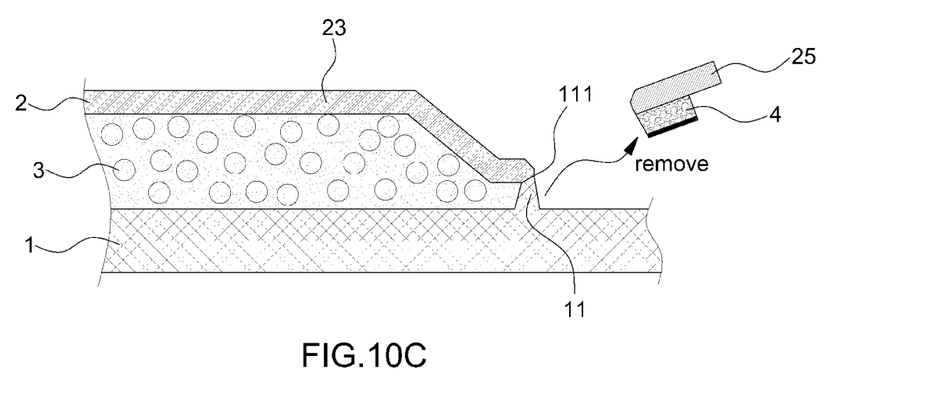

The protrusion 11 may seal against the foam liquid 31 when the crash pad is manufactured. Referring to FIGS. 10A-10C, since the foam liquid 31 is inserted and the mold 5 is enclosed before foaming of the foam liquid 31 occurs, the protrusion 11 interrupts the contact between the foam liquid 31 and the foam tape 4 so that the foam liquid 31 and the foam tape 4 cannot contact.

The conventional crash pad is characterized in that the foam liquid 31 and the foam tape 4 are foam-reacted in a contact condition to adhere completely. However, as described above, a plasticizer of the skin 2 transits to the foam tape 4 in the heat resisting test process to reduce the adhesive force of the foam tape 4 so that the foam tape 4 is detached together with the foaming layer 3.

According to the present disclosure, the foam tape 4 does not act as the final sealing, but instead, the protrusion 11 seals, and thereafter, the foam tape 4 and the skin 2 are removed together, thus improve quality by preventing detachment of the foaming layer 3 in the heat resisting test process.

Referring to FIGS. 9A and 9B, the protrusion 11 may be closely attached to the foam tape 4. The foam tape 4 may be further easily removed later by reducing the amount of the foam liquid 31 absorbed into the foam tape 4 by minimizing the amount of the foam liquid 31 remained between the foam tape 4 and the protrusion 11 when the mold 5 is closed. Furthermore, since the amount of the removed foam liquid 31 is reduced, production efficiency increases.

The protrusion 11 may be inclined such that a head 111 which contacts the skin 2 has a sharp end. Therefore, when the core 1 and the skin 2 are pressed, the protrusion 11 enters into the skin 2 such that the foam tape 4 and a distal end 25 of the skin 2 may be easily removed. In addition, since the skin 2 and the protrusion 11 are strongly combined, the protrusion 11 may further effectively seal the foam liquid 31.

Referring to FIGS. 6, 9A, and 9B, the skin 2 includes a forming space 21 inside of which the foam layer 3 is formed, a body portion 23 forming the forming space 21, and a distal end 25 elongated from the body portion 23 and contacting the core 1 (exactly the protrusion 11).

For the skin 2, a variety of materials may be used, or more specifically, a polyvinyl chloride (PVC) powder slush may be used.

In the present disclosure, "the inside" means the inside on the basis of a contour of the crash pad, that is the direction toward the foam layer 3, and "the outside" means the outside on the basis of a contour of the crash pad.

The distal end 25 may extend and be bent from the body portion 23 to be close to the parallel with respect to the core 1. Furthermore, the distal end 25 further extends to a certain length to the outside from a portion near the protrusion 11 so that the foam tape 4 adheres thereto.

The distal end 25 may include a weakened section 251 recessed from an outside surface of the skin 2 adjacent the protrusion 11. Since the skin 2 of the weakened section 251 is thin in its thickness, the foam tape 4 and the distal end 25 remaining from the weakened section 251 may be easily removed in a condition where the final sealing of the foam layer 3 through the protrusion 11 and the skin 2 is completed.

Referring to FIG. 6, the foam tape 4 may be attached to the distal end 25 of the skin 2 to prevent the overflow phenomenon of the foam liquid 31 injected into the forming space 21 before pressing the mold 5. Furthermore, referring to FIG. 10A, in the condition where the protrusion 11 and the skin 2 do not contact when the form 5 is pressed, since the forming space 21 is not sealed without the foam tape 4 so that the foam liquid 31 is leaked, the foam tape 4 may seal to prevent it.

However, as shown in FIG. 10B, if the skin 2 and the protrusion 11 are pressed so that the forming space 21 is sealed, the foam tape 4 is removed together with a part of the distal end 25 as described above after the foaming process is completed as shown in FIG. 10C.

Unlike the conventional crash pad, according to the present disclosure, since the foam tape 4 is removed, the foam tape 4 may be easily removed by lowering the adhesive force of the foam tape 4 to a level where the foam tape 4 may be easily peeled off.

Furthermore, according to the present disclosure, since the foam reaction occurs in a condition where the foam liquid 31 and the foam tape 4 are prevented from contacting by the protrusion 11 as described above so that the foam liquid 31 is not absorbed into the foam tape 4, the foam tape 4 may be easily removed.

The foaming layer 3 is formed by generating the foam reaction by injecting the foam liquid 31 into the forming space 21 and pressing the lower mold 52 toward the upper mold 51. For the foam liquid 31, a variety of materials may be used, however, a polyurethane liquid may be used.

According to the present disclosure, while the mold 5 is pressed, since it is pressed after positions of the protrusion 11 and the foam tape 4 are established so that the protrusion 11 and the foam tape 4 are closely adhered, an excessive loss of the foam liquid 31 is prevented by minimizing the foam liquid 31 remaining between the protrusion 11 and the foam tape 4.

The method of manufacturing the open core crash pad according to the present disclosure includes inserting the core 1 into the upper mold 51 and inserting the skin 2 into the lower mold 52. The foam tape 4 is attached to the core 1 or the skin 2 and the foam liquid 31 is injected into the forming space 21. The foaming layer 3 is manufactured by pressing the upper mold 51 and the lower mold 52.

Since the descriptions of the core 1 and the skin 2 are as described above, the description thereof will be omitted to avoid the duplicate description.

In the step of inserting, the core 1 includes a protrusion 11 adjacent the weakened section 251 of the skin 2.

In the step of attaching, the foam tape 4 may be attached to the distal end 25 of the skin 2 to which the foam liquid 31 injected into the forming space 21 flows down, to outside the weakened section 251. Therefore, when the mold 5 is pressed, the protrusion 11 and the foam tape 4 may be closely attached.

In addition, the foam tape 4 may be attached to both ends of the skin 2 so that the foam liquid 31 does not leak before the protrusion 11 and the skin 2 contact while pressing the mold 5.

In the step of injecting, since the foam liquid 31 is clogged by the foam tape 4, it may not flow down and leak.

In the step of manufacturing, if the mold 5 is pressed, the foam liquid 31 flows uniformly into the forming space 21 and may be prevented from leaking by the foam tape 4 and finally by the protrusion 11.

When a foaming reaction is completed and the foaming layer 3 is formed, the foam tape 4, which is attached to a part of the protrusion 11, is removed. According to the present disclosure, the skin 2 is relatively thin at the weakened section 251 and the weakened section 251 may become thinner by sharpening the head 111 of the protrusion 11 to dig into the skin 2. The foam tape 4 may be prevented from attaching to a side of the protrusion 11 or one surface of the core 1 by preventing the transition of the foam liquid 31 into the foam tape 4 by closely attaching the protrusion 11 and the foam tape 4. Further, the foam tape 4 may be easily removed while the foam tape 4 is attached while an adhesive force of the foam tape 4 decreases.

According to the present disclosure, since the protrusion 11 seals against the foaming layer 3, the detachment phenomenon of the foam tape 4 does not occur, unlike the prior art.

Furthermore, since the present disclosure includes the weakened section 251 of the skin 2, removal of the foam tape 4 and some of the skin 2 after the foaming is easy.

Therefore, according to the present disclosure, the problem in the conventional crash pad may be solved and the crash pad having the improved quality may be provided.

The open core crash pad according to the present disclosure including the constructions described above has following effects:

The open core crash pad of the present includes a protrusion, whereby the attachment of the foam liquid and the foam tape is prevented when the mold is pressed, whereby the foam tape may be removed after the process of foaming.

The open core crash pad of the present includes a weakened section, whereby the skin at the outer side of the weakened section together with the foam tape may be easily removed after the sealing of the foaming layer is completed.

Since the protrusion and the skin contact each other so as to seal and the foam tape is removed together with a part of the skin, detachment of the foam tape does not occur whereby the quality is improved.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An open core crash pad comprising:
    a core;
    a skin abutting the core to include a forming space therebetween;
    a foaming layer foam-formed by injecting a foam liquid into the forming space; and
    a foam tape for preventing an overflow of the foam liquid,
    wherein the skin comprises: a body portion; and a distal end extending from the body portion in parallel with the core,
    wherein the core comprises a protrusion protruding toward the skin and formed at which the core and the distal end contact,
    wherein the distal end comprises a recessed section which is recessed from an outer surface of the skin at which the distal end contacts the protrusion,
    wherein the distal end is attached with the foam tape, and wherein the distal end and the foam tape are configured to be removed together from the open core crash pad.

2. The open core crash pad of claim 1, wherein the protrusion and the foam tape are attached to each other.

3. The open core crash pad of claim 1, wherein the protrusion comprises a head which is inclined and has a sharp end.

4. The open core crash pad of claim 1, wherein the skin is a polyvinyl chloride (PVC) powder slush.

5. A method of manufacturing an open core crash pad comprising:
   inserting a core into an upper mold and inserting a skin into a lower mold;
   attaching a foam tape to the core or the skin;
   injecting a foam liquid into a forming space of the skin; and
   manufacturing a foaming layer by pressing the upper mold and the lower mold,
   wherein the skin comprises: a body portion; and a distal end extending from the body portion in parallel with the core,
   wherein the core comprises a protrusion protruding toward the skin and formed at which the core and the distal end contact, and
   wherein the distal end comprises a recessed section recessed from an outer surface of the skin at which the distal end contacts the protrusion, and the distal end is configured to be removed together with the foam tape.

6. The method of claim 5, wherein the foam tape is closely attached to the protrusion when the upper mold and the lower mold are pressed.

7. The method of claim 5, wherein the protrusion comprises a head which is inclined and has a sharp end.

* * * * *